United States Patent

Unternahrer et al.

[11] Patent Number: 5,930,282
[45] Date of Patent: Jul. 27, 1999

[54] METHOD AND APPARATUS FOR ADJUSTING THE PUMP DISTRIBUTION IN A LASER

[75] Inventors: Josef Robert Unternahrer, Niskayuna; Mark Jon Kukla, Ballston Spa; John Leo August, Jr., Schenectady, all of N.Y.

[73] Assignee: General Electric Company, Schenectady, N.Y.

[21] Appl. No.: 08/858,103

[22] Filed: May 19, 1997

[51] Int. Cl.⁶ .................................................. H01S 3/09
[52] U.S. Cl. .................. 372/69; 372/70; 372/71; 372/99; 372/107; 372/108; 372/14; 372/15
[58] Field of Search .................. 372/69, 14, 15, 372/20, 23, 70, 71, 72, 75, 92, 97, 98, 99, 108, 109, 107

[56] References Cited

U.S. PATENT DOCUMENTS

| | | | |
|---|---|---|---|
| 3,633,126 | 1/1972 | Martin et al. | 372/69 X |
| 3,679,999 | 7/1972 | Chernoch | 372/69 X |
| 4,730,324 | 3/1988 | Azad | 372/33 |
| 4,740,983 | 4/1988 | Azad | 372/66 |
| 4,782,495 | 11/1988 | Azad | 372/99 |
| 4,800,569 | 1/1989 | Azad | 372/99 |
| 5,202,893 | 4/1993 | Kubota et al. | 372/34 |
| 5,475,702 | 12/1995 | August, Jr. et al. | 372/69 |
| 5,491,707 | 2/1996 | Rieger et al. | 372/25 |
| 5,528,612 | 6/1996 | Scheps et al. | 372/23 |
| 5,737,347 | 4/1998 | Scheps et al. | 372/23 |
| 5,793,791 | 6/1998 | Lasser et al. | 372/69 |

OTHER PUBLICATIONS

R.J. Shine et al., 40 W CW, TEMoo Mode, Diode–Laser–Pumped, Nd:YAG Slab Laser, 24 OSA Proceedings on Advanced Solid State Lasers 216–218 (1995).

Atlas 1kW Preliminary Design Review, Presented to Air Force Phillips Laboratory by General Electric Co. and Fibertek, Inc., Jul. 6, 1994.

*Primary Examiner*—Brian Healy
*Attorney, Agent, or Firm*—Donald S. Ingraham; Douglas E. Stoner

[57] ABSTRACT

An exemplary laser apparatus comprises an amplification medium which amplifies a coherent beam passing through the amplification medium, a pump which provides energy to the amplification medium, a tunnel having a first end proximate to the pump and a second end proximate to the amplification medium, wherein the energy provided by the pump passes through the tunnel en route to the amplification medium, and a moveable member for adjusting a spatial distribution of the energy provided to the amplification medium by the pump. The moveable member typically comprises a flat, reflecting strip or flap which redirects a portion of the energy of the pump beam to a peripheral region of the amplification medium. The angular and translational position of the flap is adjustable on line so that the pump distribution can be adjusted while the laser is running to reduce observed optical distortions caused by heating of the amplification medium.

33 Claims, 9 Drawing Sheets

METHOD AND APPARATUS FOR ADJUSTING THE PUMP DISTRIBUTION IN A LASER

BACKGROUND

1. Field of the Invention

The present invention relates generally to solid state lasers, and more particularly to a method and apparatus for controlling the pump distribution in a face pumped, diode pumped slab laser.

2. Description of the Related Art

A typical fluid-cooled slab laser includes an amplification medium in the form of a glass or crystalline solid slab, a pump such as a laser diode array which provides energy to the amplification medium to pump the atoms in the amplification medium to a higher energy level, and a cooling channel on one or more faces of the amplification medium to fluid cool the amplification medium. A laser beam is produced by oscillating a beam of coherent light through the amplification medium, whereby the beam of coherent light is amplified with each pass through the amplification medium.

In solid state lasers, a significant amount of heat is generated in the amplification medium by the energy from the pump. To maintain a high output power level in the laser, the heat can be dissipated by continuously flowing the cooling fluid through the cooling channel over the face of the slab. However, several optical distortions result from this arrangement. For example, a thermal gradient is produced within the slab, in which the inner portion of the slab is at a higher temperature than the outer portion. The thermal gradient causes a variation of the refractive index of the slab, known as "thermal lensing", which results in wavefront distortion of the coherent beam. In addition, fluid cooling of the slab causes mechanical stresses and strains which distort the major faces of the slab. The mechanical stresses and strains typically introduce a negative focal power at the edges of the slab, resulting in an additional wavefront distortion of the coherent beam. Fluid cooling also introduces variations in the refractive index of the slab due to a stress-optic effect.

The distortions of the slab are generally most pronounced in the edge regions of the slab. Thus, it is possible to avoid the optic effects of these distortions to a significant extent by confining the coherent beam to the central region of the slab. However, typical slabs (e.g. yttrium-aluminum-garnet) are limited in size by current crystal growth technology. Therefore, it is desirable to utilize the entire slab for amplification to optimize the utility of the laser.

Another known method of compensating for optical distortions involves propagating the coherent beam through different regions (e.g. inner and outer) of the slab by internal reflection so that each ray passes through substantially identical thermal environments. This method, which is described in commonly-owned U.S. Pat. No. 3,633,126 to Martin et al, does not, however, address the reduction of physical distortions of the slab.

Commonly-owned U.S. Pat. No. 4,730,324 to Azad discloses an apparatus for compensating for wavefront distortions in a slab laser which includes a pump lamp surrounded by a reflector which directs optical energy to the slab. The reflector has a shape which concentrates a selected quantity of optical radiation from the pump lamp into a central portion of the slab to introduce a positive focal power lens effect approximately equal in magnitude to the negative focal power lens effect at the lateral edges of the slab. The Azad apparatus, however, involves the formulation of a complex model of the laser configuration to determine the desired shape of the reflector based on ray tracing optimization, the pump cavity geometry, the optical properties of the components of the laser, and an emission model for the lamps which describes the wavelength and directional dependence of optical radiation emitted therefrom.

It would be desirable, therefore, to have a method and apparatus for selecting the pump distribution in a laser to reduce optical distortions without the need to formulate a complex optical model of all components of the laser. It would also be desirable to have a method and apparatus for adjusting the pump distribution in a laser while the laser is running to compensate for changing optical distortions on-line and to compensate for changes resulting from replacement of the slab.

SUMMARY

A laser apparatus, according to an exemplary embodiment of the invention, comprises an amplification medium which amplifies a laser beam passing through the amplification medium, a pump which provides energy to the amplification medium, a tunnel having a first end proximate to the pump and a second end proximate to the amplification medium such that the energy provided by the pump passes through the tunnel to the amplification medium, and a movable member for adjusting a spatial distribution of the energy provided to the amplification medium by the pump. The movable member typically comprises a flat, reflecting strip or flap which redirects a portion of the energy of the pump beam to a peripheral region of the amplification medium. The angular and translational position of the movable member is adjustable on-line so that the pump distribution can be adjusted, while the laser is running, to reduce optical distortions, for example those caused by uneven heating of the amplification medium. The angular and translational position of the movable member is adjusted with a device such as a micrometer which allows desired settings to be recorded and reproduced. Exemplary embodiments of the invention allow a slab laser to be efficiently pumped with a desired number of diodes, for example, while significantly reducing optical distortions.

BRIEF DESCRIPTION OF THE DRAWINGS

Additional features and advantages of the invention will be apparent upon reading the following detailed description, in conjunction with the accompanying drawings, in which.

DETAILED DESCRIPTION OF THE PREFERRED EMBODIMENTS

Figure 1:
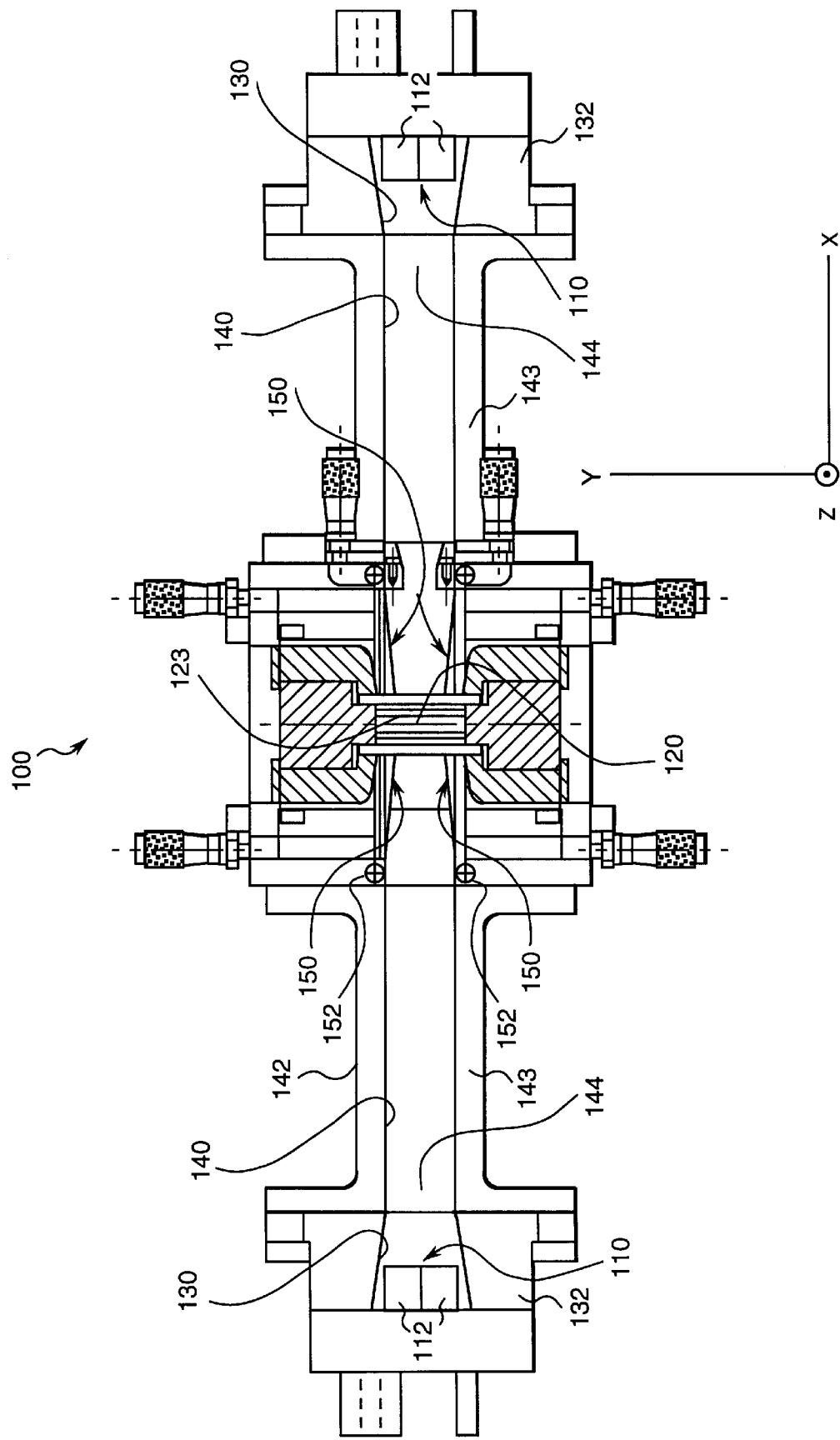
FIG. 1 is an end view of the apparatus according to an exemplary embodiment of the invention.
Figure 5:
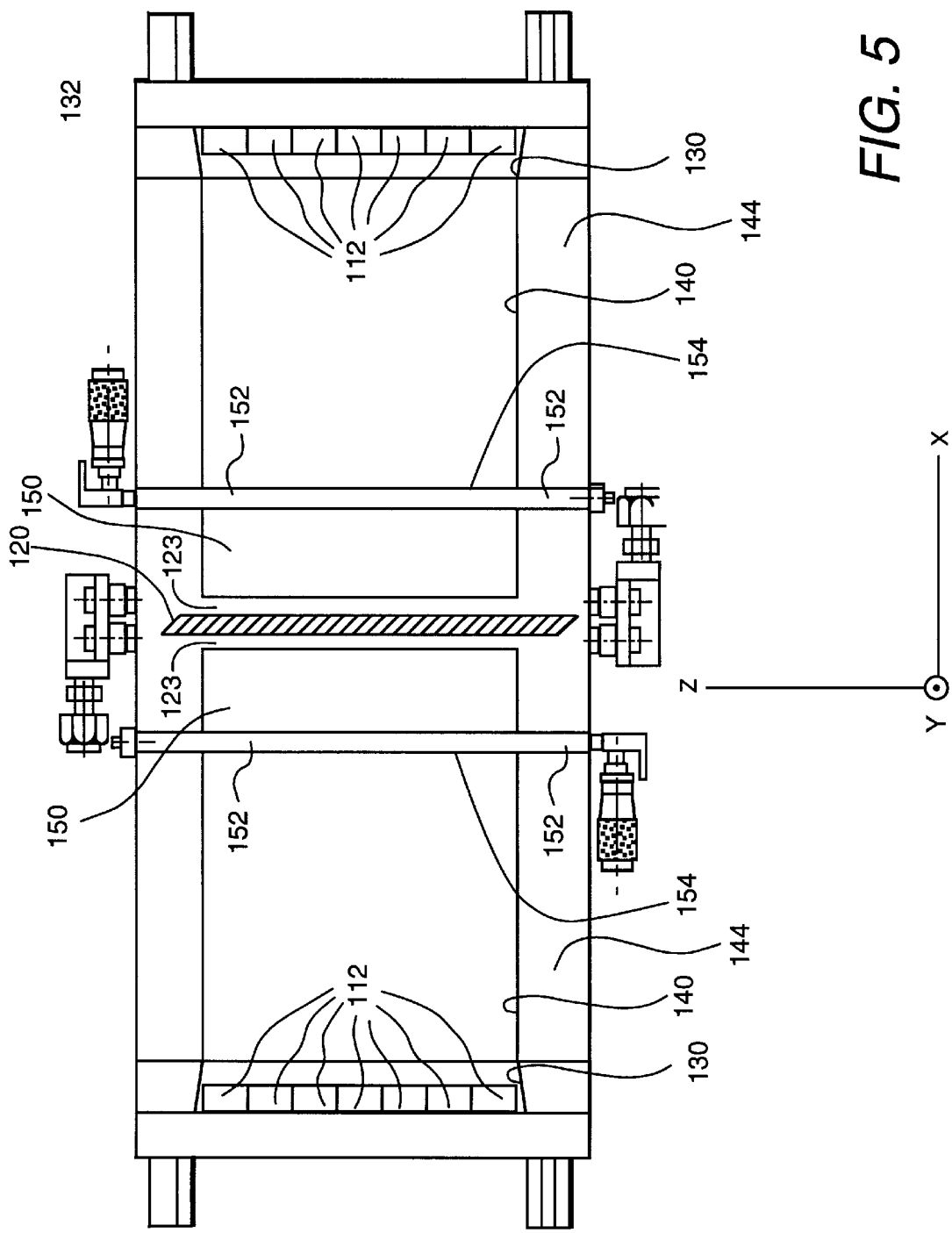
FIG. 5 is a top view of the apparatus of FIG. 1.

FIG. 1 is an end view of the apparatus according to an exemplary embodiment of the invention. The apparatus 100 comprises two diode arrays 110 which function as optical laser pumps. The diode arrays 110, according to one embodiment, each comprise two rows of seven diode modules 112. As shown in FIG. 1, the two rows of diode modules 112 are arranged one on top of the other. FIG. 5 is a top view of the apparatus 100 showing the seven diode modules 112 in each row. The diode arrays 110 generate light having significant directionality to form two pump beams which are incident on two opposing pump faces of the amplification medium 120. The pump beams propagate through concentrators 130 and homogenizer tunnels 140 en route to the pump faces of the amplification medium 120.

The diode arrays 110 are effective for pumping the amplification medium 120 to a state of population inversion. According to one embodiment, the diode modules 112 in the diode arrays 110 each include about 16 rows of 100 individual laser diodes which fit into an emitting area of 1 cm×2 cm. An exemplary diode module, which is available from Spectra Diode Labs (SDL) in San Jose, Calif., part number SDL-3243-HD, emits laser light having significant directionality with a wavelength of 807+/−3 nanometers. The coherent laser light is incident on the amplification medium 120, which may be, for example, a neodymium doped yttrium-aluminum-garnet (Nd:YAG) crystal.

The photons from the diode modules 112 in this frequency range are effective for raising the energy level of electrons in the neodymium atoms of the amplification medium 120, resulting in a population inversion. Population inversion refers to the state in the amplification medium 120 where there are more atoms having electrons at a higher energy level than at a lower energy level for a specific pair of levels. Under the conditions of population inversion, when a beam of light passes through the amplification medium 120, more photons will be created by stimulated emission than absorbed, thereby resulting in a net increase in the number of photons, i.e., an amplification of the coherent beam.

The diode arrays which are used to pump solid state lasers typically emit an inhomogeneous and unpredictable intensity distribution over space. The inhomogeneity is due to variation in intensity of different individual diodes in the array. To smooth out the inhomogeneous intensity distribution of the array 110, a beam homogenizer tunnel 140 may be provided. The homogenizer tunnel 140 may be formed in any suitable manner, such as with a top member 142 and a bottom member 143 separated by two side members 144. The inner walls of the top, bottom, and side members which form the tunnel typically are gold-plated to reduce the absorption of light. After propagating through the homogenizer tunnel 140, the spatial intensity distribution of the pump beam becomes substantially constant over a cross section perpendicular to the direction of propagation of the pump beam.

In many cases, it may be desirable to have an emitting area of the diode array 110 which is greater than the area of the pump face of the amplification medium 120. For example, electrical and mechanical restrictions may make it difficult or impossible to mount a sufficient number of diode modules 112 together in an area less than or equal to the area of the pump face which provide the desired pump energy. This is important, for example, in slabs of yttrium-aluminum-garnet, which are generally available in lengths of only 25 cm or less.

To increase the amount of pump energy which is transmitted to the amplification medium 120, a larger diode array 110 having an area greater than the pump face may be used. To match the emitting area of the diode array 110 with the area of the pump face, a concentrator 130 is provided which may be formed with suitable top, bottom and side members. The concentration of the pump beam can be both in height (Y-axis direction in FIG. 1) and in length (Z-axis direction in FIG. 5). The concentrator 130 and the homogenizer tunnel 140 can be built as two separate parts to provide modularity, or as a single unit.

The concentrator 130 also serves to increase the gain of the laser apparatus 100, since the smaller the pumped cross section of the amplification medium 120, the higher the gain, for the same absorbed pump power. In addition, concentration of the pump energy into a smaller area reduces the size and hence cost of the amplification medium 120. Also, concentration in the length (z-axis direction) decreases the losses in the amplification medium 120, since the losses are essentially proportional to the length of the amplification medium.

It is preferable, however, to limit the degree of concentration of the pump beam, since concentration produces a corresponding loss in directionality, i.e. increased divergence, of the pump beam. The directionality of the pump beam provides greater control over the adjustment of the pump distribution, as will be described further below.

Figure 2:
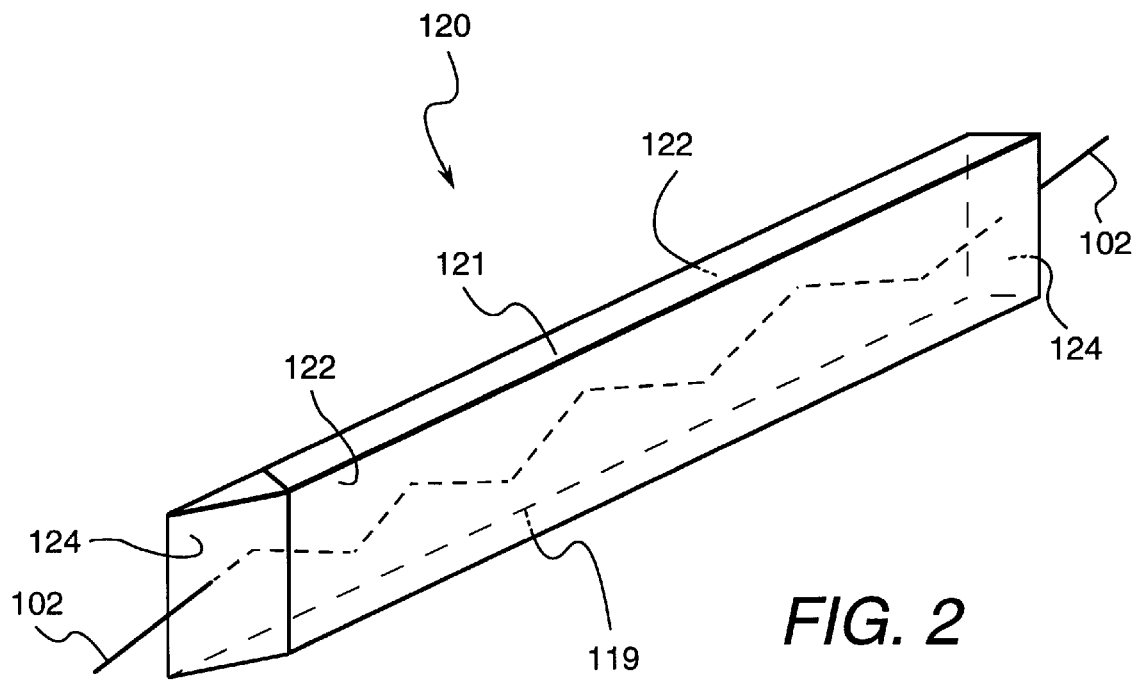
FIG. 2 is a perspective view of the amplification medium of FIG. 1 according to an exemplary embodiment of the invention.

The amplification medium 120 typically comprises a neodymium:yttrium-aluminum-garnet (Nd:YAG) slab which amplifies a coherent beam of light passing through the amplification medium 120. FIG. 2 shows a perspective view of an exemplary amplification medium 120. The amplification medium 120 includes two pump faces 122, two end faces 124, a top face 121, and a bottom face 119. The view of the amplification medium 120 shown in FIG. 1 is of one of the end faces 124. A coherent beam 102 is amplified by stimulated photon emission as it passes through the amplification medium 120. The pump faces 122 receive the pump beams from the diode arrays 110 and are cooled by a suitable cooling fluid which runs through cooling channels 123 (FIG. 1) adjacent to the pump faces 122.

The heat generated by the pump beam causes the amplification medium 120 to have a temperature gradient therein, in which the inner region of the amplification medium 120 is at a higher temperature than the outer region. The temperature gradient within the amplification medium 120 causes a variation of the refractive index known as "thermal lensing", which results in wavefront distortions of the coherent beam. As described in commonly owned U.S. Pat. No. 3,633,126 to Martin et al, optical distortions in the amplification medium 120 can be reduced by propagating the coherent beam 102 through different regions (e.g. inner and outer) of the amplification medium 120. As shown in FIG. 2, the coherent beam 102 can be passed through the amplification medium 120 in an off-axial direction to effect multiple total internal reflections of the coherent beam 102 from the pump faces 122 of the amplification medium 120. Because each ray of the coherent beam 102 passes through substantially identical thermal environments during the reflective transmission of the beam 102, the net distortion of the beam 102 is reduced. Typically, the end faces 124 are formed at an oblique angle to the pump faces 122 so that the coherent beam 102 travels in a zig-zag pattern through the amplification medium 120.

Figure 3:
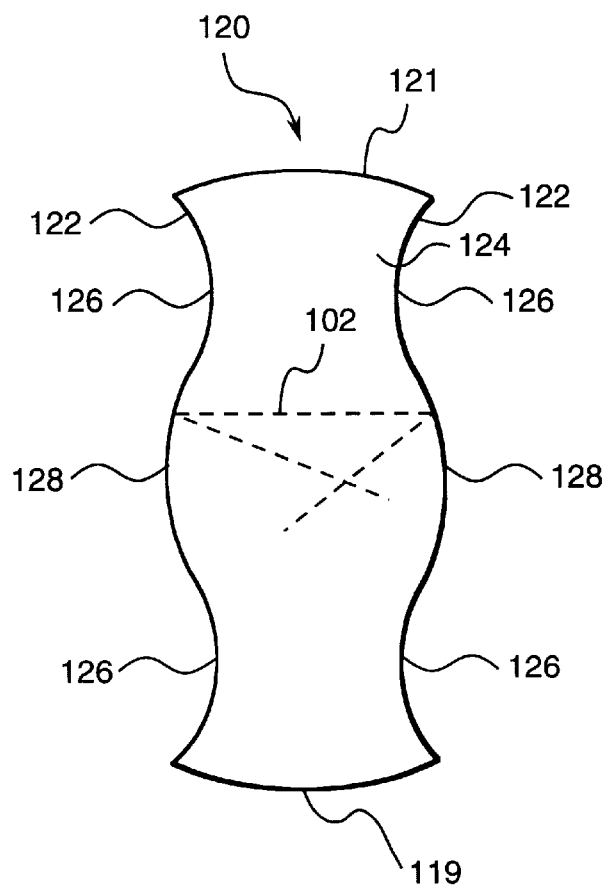
FIG. 3 is a cross section of the amplification medium of FIG. 2 which illustrates physical distortions of the amplification medium.

The heating of the amplification medium 120 by the pump beam, and the cooling of the pump faces 122 by the cooling fluid also cause mechanical distortions. The thermal gradient between the inner and outer regions of the amplification medium 120 results in the inner region being in compression and the outer region being in tension. FIG. 3 is a cross section of the amplification medium 120 which shows typical mechanical distortions, greatly exaggerated. The amplification medium 120 has four regions 126 of negative focal power which act as a negative lens and two regions 128 of positive focal power which act as a positive lens.

The negative and positive lens regions result in wavefront distortions of the coherent beam 120. For example, the phase distribution over space of a wave traveling through these regions is altered, because the focal power of the amplification medium 120 varies over space. The varying focal power of the amplification medium 120 can produce higher order (e.g. greater than quadratic) wavefront curvature, which is difficult to correct with a lens, and which therefore reduces the focusability of the coherent beam.

Figure 4:
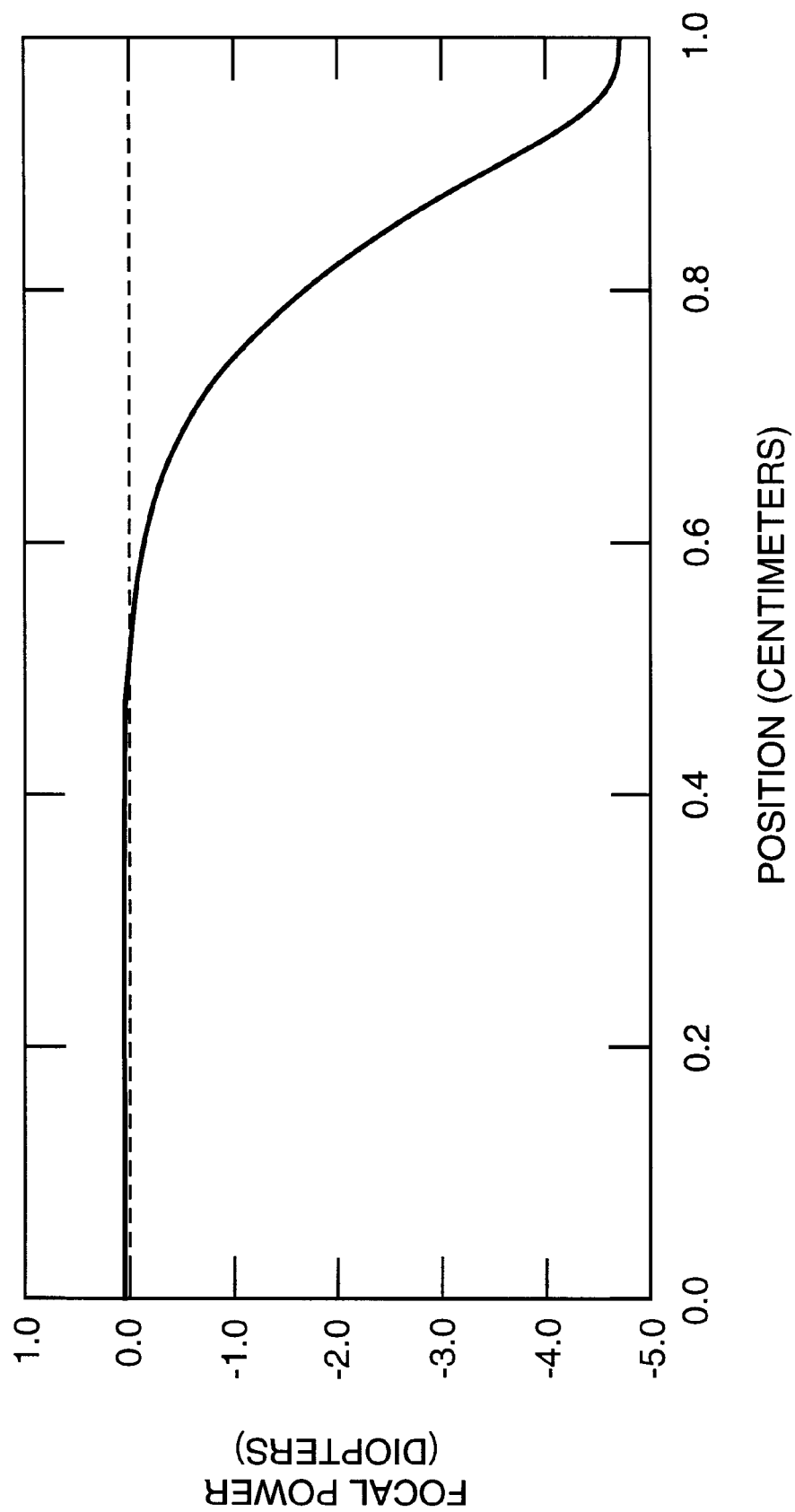
FIG. 4 is a graph of the focal power distortion of the amplification medium of FIG. 2.

FIG. 4 is a graph of the optical distortions in the amplification medium 120 as a function of position with a flat pump distribution, where the position is measured from the center of the amplification medium 120 to the top face 121 or bottom face 119 of the amplification medium 120. As shown in FIG. 4, toward the top or bottom face of the amplification medium, a significant negative focal power is introduced, which causes significant optical distortions.

To compensate for the effects of the negative focal power regions 126 of the amplification medium 120, the laser apparatus 100 includes a mechanism for redistributing the energy of the pump beam. As shown in FIG. 1, the apparatus 100, according to an exemplary embodiment of the invention, includes a pair of redirecting members 150 for each pump beam. The redirecting members 150 are thin, rigid strips or flaps according to an exemplary embodiment, each having a substantially planar face which reflects energy of the pump beam. Other embodiments of the invention may include redirecting members of a different shape, e.g. curved, or redirecting members which redirect the pump beam by means other than reflection, e.g. refraction.

Figure 6:
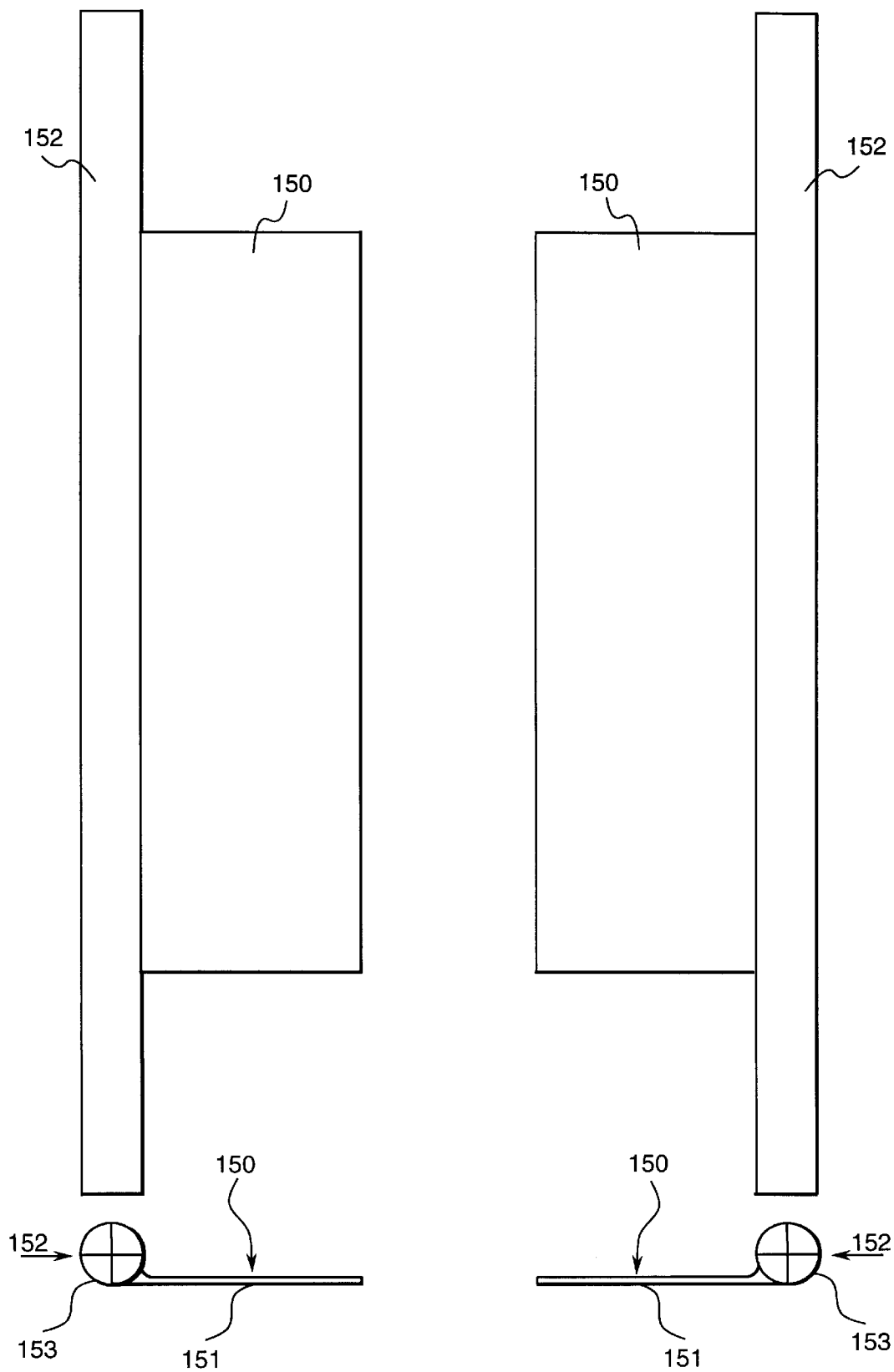
FIG. 6 illustrates the redirecting members of the apparatus of FIG. 1.

FIG. 5 is a top view of the apparatus 100 which shows two redirecting members 150 as well as the rows of diode modules 112, the concentrator 130, and the homogenizer tunnel 140. Each redirecting member 150 is fixed to a cylindrical member 152 located at the end 154 of the tunnel 140 closest to the amplification medium 120. As most clearly shown in FIG. 6, each redirecting member 150 has a planar reflecting surface 151 which is tangent to the outer surface 153 of the cylindrical member 152. The redirecting members 150 are typically designed such that no light can be trapped by the cylindrical member 152. In addition, the parts which are exposed to the pump light or the fluorescence light from the amplification medium are typically gold plated to reduce the absorption of light and therefore the production of heat.

Each redirecting member 150 extends from the end 154 of the tunnel 140 to the cooling channel 123. The redirecting members 150 define a space through which the pump beam passes after passing through the homogenizer tunnel 140. The position of the redirecting members 150 can be adjusted to control the spatial distribution of energy ("pump distribution") of the pump beam. For greater control of the pump distribution, the ends of the redirecting members 150 are typically situated as close to the amplification medium 120 as possible.

Figure 7:
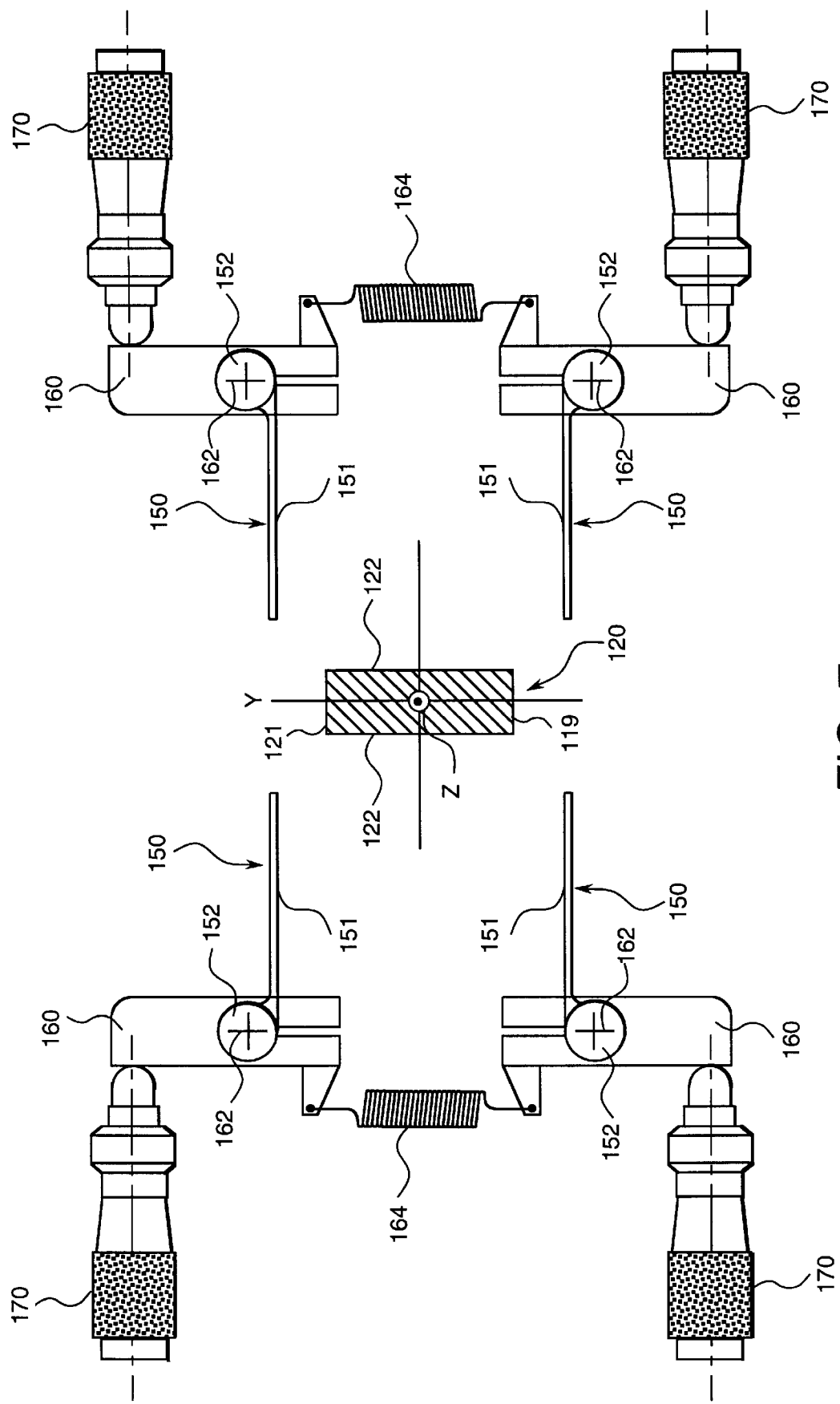
FIG. 7 illustrates the angular adjustment of the redirecting members.

FIG. 7 is a side view of the apparatus which illustrates adjustment of the angular orientation of the redirecting members 150. The cylindrical member 152 for each redirecting member 150 is fixed in a rotation housing 160 which rotates about the Z axis at a pivot point 162. The rotation housing 160 and redirecting member 150 are rotatably biased with a bias spring 164 which forces the inner reflecting surfaces 151 of the redirecting members 150 apart. To counter the bias force of the spring 164, an adjustment device 170, such as a micrometer or fine screw, is provided. The adjustment device 170 typically includes a scale which allows a particular setting (i.e. angular orientation of the redirecting member 150) to be measured and reproduced. Each of the four adjustment devices 170 shown in FIG. 7 can be set independently.

Figure 8:
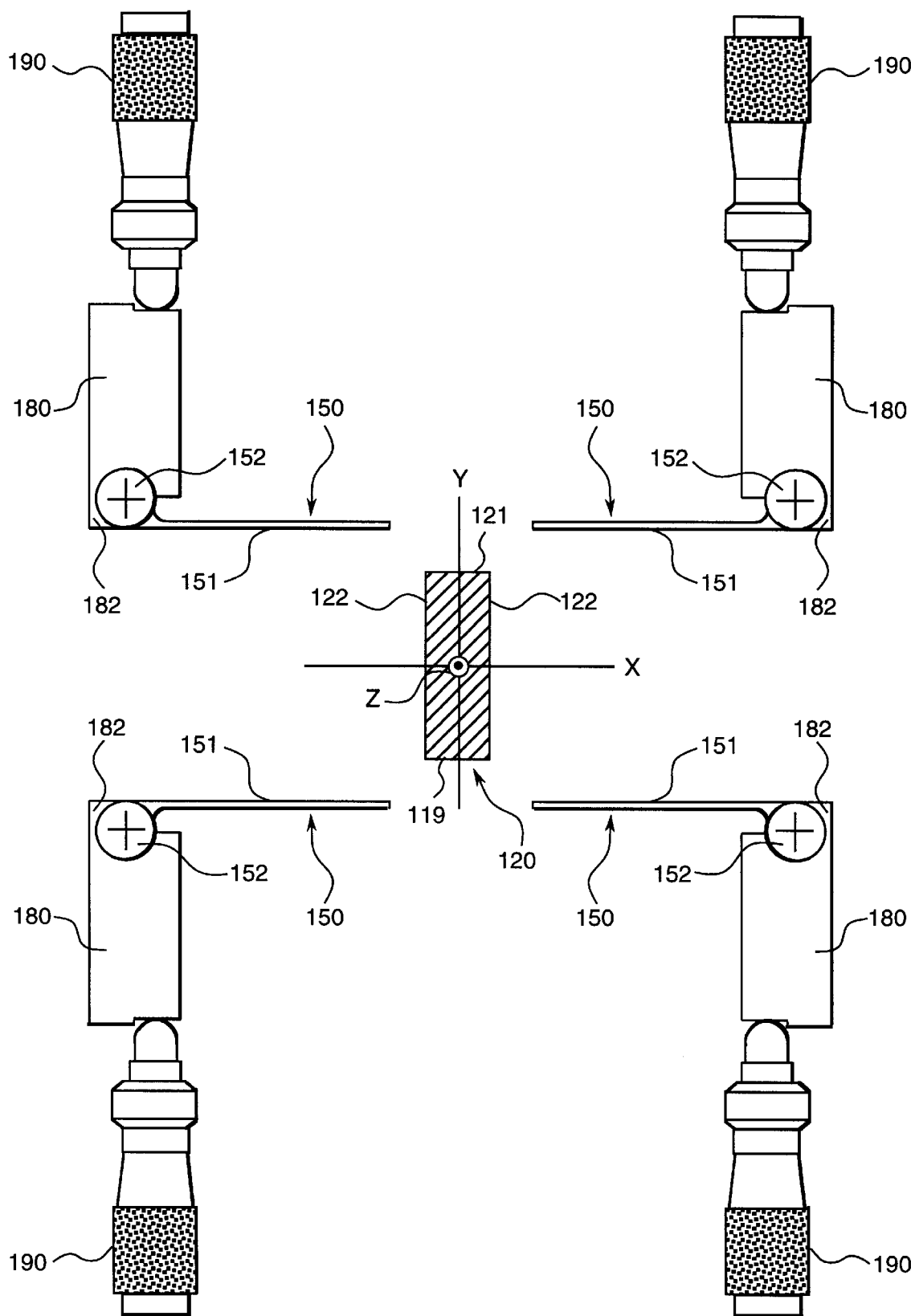
FIG. 8 illustrates the translational adjustment of the redirecting members.

FIG. 8 is a side view of the apparatus which illustrates translational adjustment of the redirecting members 150 with respect to the Y axis. Each redirecting member 150 and cylindrical member 152 is translationally fixed to a translation housing 180. Each translation housing 180 is moveable along the Y axis with respect to the tunnel 140 so that the distance between two opposing redirecting members 150 can be adjusted. Adjustment devices 190, e.g. micrometers, are provided with scales so that the translational position of each redirecting member 150 can be independently measured and reproduced.

The rotation housings 160, translation housings 180, and cylindrical members 152 are typically designed so that no photons of the pump beam are trapped en route to the amplification medium 120. For example, as shown in FIG. 8, the translation housing 180 includes a curved portion 182 which fits around the cylindrical member 152 of the redirecting member 150 with a small clearance to prevent light from being absorbed between the redirecting member 150 and the translation housing 180. Also, every part that is exposed to the pump light or the fluorescence light from the amplification medium is typically gold plated to minimize the absorption of light.

In addition to the adjustments of the redirecting members 150 shown in FIGS. 7 and 8, the apparatus 100 preferably includes a mechanism for adjusting the height (Y direction) of the tunnel 140. This may be accomplished by removing the top and bottom members 142, 143 which form the top and bottom inside surfaces of the tunnel 140, and inserting spacers of a desired thickness on the side members 144 (FIG. 1). The combined height of the side member 144 and spacers determines the height of the tunnel 140. The height of the tunnel is typically adjusted to be equal to or slightly smaller than the separation distance between the redirecting members 150 adjacent the tunnel so that the redirecting members do not create a shoulder at the end of the tunnel 140 which would reflect pump light.

Figure 9C:
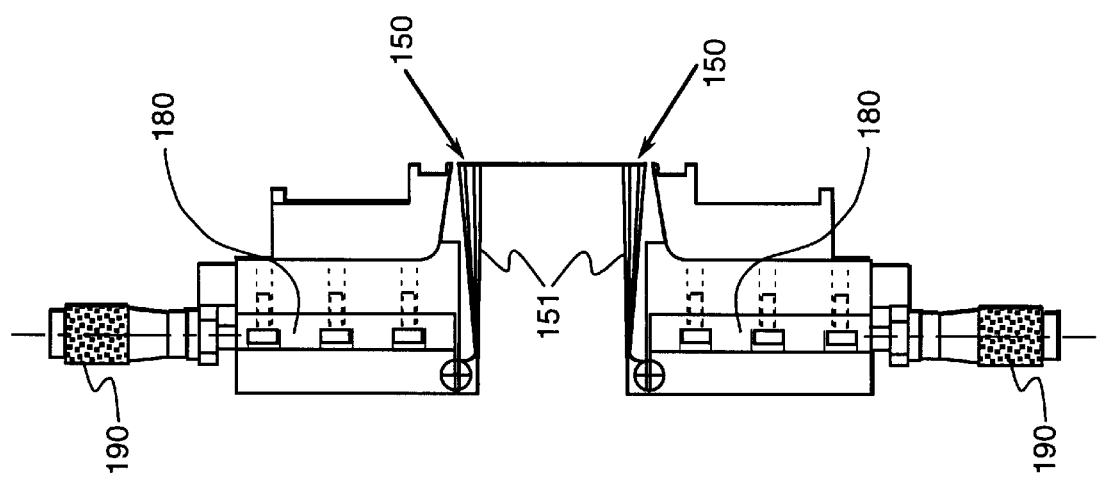
FIGS. 9a through 9c illustrate various configurations of the redirecting members.
Figure 9B:
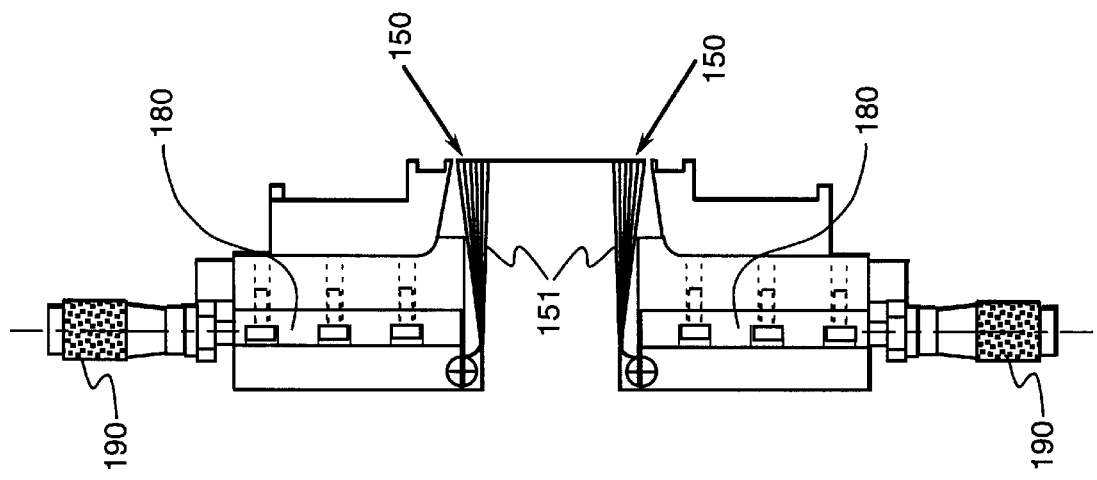
Figure 9A:
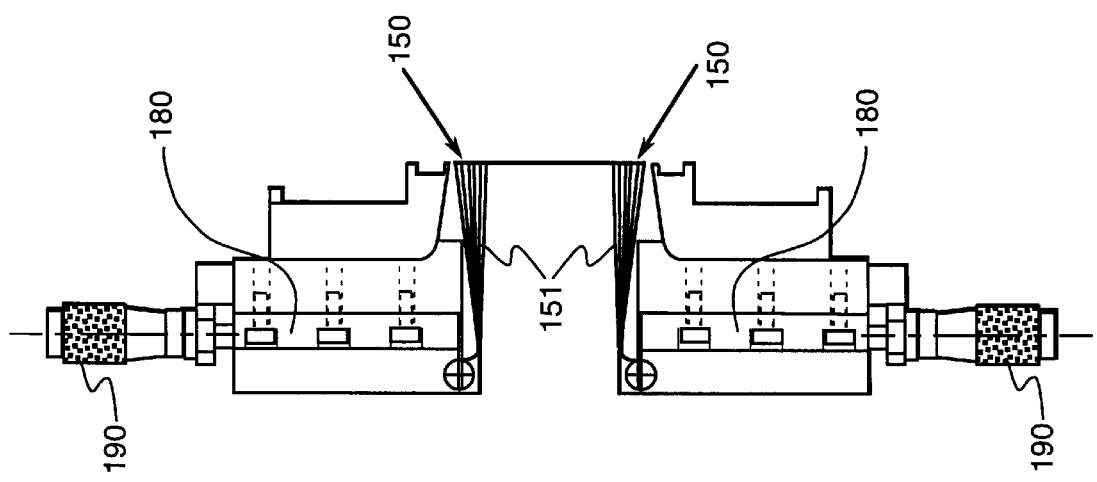

FIGS. 9a–9c illustrate examples of different configurations of the redirecting members 150. The separation distance between the redirecting members 150 adjacent to the tunnel 140 is about 22 mm in FIG. 9a, 17 mm in FIG. 9b, and 27 mm in FIG. 9c. These dimensions are of course merely exemplary. The tunnel height is typically equal to or slightly less than these distances so that no shoulder is created by the parts at the end of the tunnel. However, the tunnel height can be independently adjusted to achieve any desired optical objectives.

FIGS. 9a–9c also illustrate examples of the angular position of the redirecting members 150. In FIGS. 9a–9c, multiple angular positions are shown simultaneously for the purpose of illustration. However, only one of the redirecting members shown is actually used in operation of the apparatus. In FIG. 9a, the angle between the inner surface 151 of the redirecting member 150 and the inner surface of the tunnel 140 is set at about +4, 0, and −2.5 degrees. In FIG. 9b, the angle between the inner surface of the redirecting member and the inner surface of the tunnel is set at about +4, 0, and −5.5 degrees. In FIG. 9c, the angle between the inner surface of the redirecting member and the inner surface of the tunnel is set at about +4 and +1.5 degrees. The angles are set with the adjustment devices 170 shown in FIG. 7.

Figures 10A, 10B:
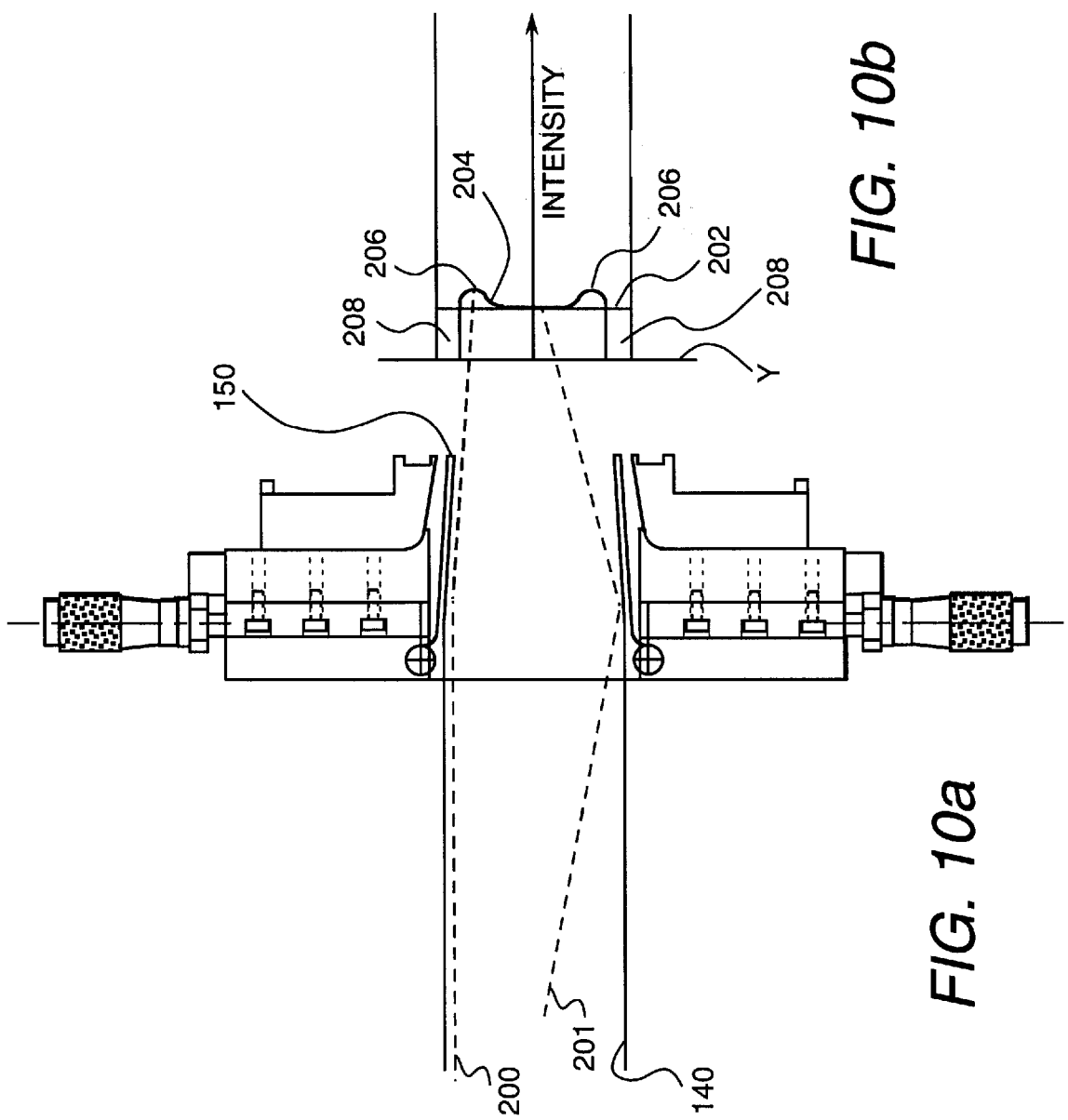
FIGS. 10a through 10b illustrate control of the pump distribution which may be achieved with exemplary embodiments of the invention.

FIGS. 10a and 10b illustrate an example of the change in pump distribution which may be achieved with exemplary embodiments of the invention. As shown in FIG. 10a, a ray 200 of the pump beam reflects off the inner reflecting surface of the redirecting member 150. The ray 200 is redirected inward toward the center of the amplification medium.

FIG. 10b illustrates an example of the pump distribution incident on the amplification medium 120 as a function of height along the Y axis. A first curve 202 is substantially flat and represents the flat pump distribution which is achieved without the use of the redirecting members 150. With such a flat pump distribution, the focal power of the amplification medium 120 becomes increasingly negative toward the upper and lower edges of the amplification medium 120 along the Y axis, as shown in FIG. 4.

A flat pump distribution also has the disadvantage that it is wasteful of energy. The loss of energy arises because the cooling channel 123 necessitates a space between the end of the tunnel 140 and the amplification medium 120. In crossing that space, the pump distribution maintains its flat characteristic only in the central portion of the pump beam. Therefore, a larger tunnel is required to be pumped so that the central region will cover the entire amplification medium 120. The outer region of the enlarged pump beam is therefore wasted.

A second curve 204 in FIG. 10b represents an example of the pump distribution which is achieved using the redirecting members 150. The pump distribution 204 includes two regions 206 of increased intensity at the upper and lower pump face regions of the amplification medium 120.

The regions 206 of increased intensity are obtained by redirecting a portion of the energy of the pump beam. The pump distribution 204 has a height in the Y direction which is less than the height of the flat pump distribution 202. The energy from a peripheral region 208 of the flat pump distribution 202 may be redirected to the regions 206 of increased intensity. The device may be configured, therefore, such that the height of the tunnel 140 in the Y direction is greater than the height of the pumped region of the amplification medium 120. This creates the peripheral region 208 which is redirected to the region 206 to increase the intensity of the region 206.

The angular orientation of the redirecting members 150 influences the shape of the region 206 of increased intensity. The separation distance between the tips of the redirecting members 150 closest to the amplification medium 120 (a function of both the translational and angular positions of the redirecting members) influences the position of the region 206 of increased intensity. The regions 206 of increased intensity can be made to generally correspond with the regions of negative focal power 126 in the amplification medium 120.

The angular orientation and separation distance of the redirecting members 150 is typically chosen to obtain a pump distribution that minimizes the amount of optical distortions in the amplification medium 120. For example, by transmitting increased pump energy into the regions 126 of negative focal power, the negative focal power effect can be substantially reduced. This is accomplished because the increased pump intensity in the region 206 (FIG. 10a) widens the negative focal power region 126 (FIG. 3) of the amplification medium 120 by thermal expansion. Hence, both the negative focal power regions 126 and the positive focal power region 128 (which results from the curvature of the pump faces) are reduced.

To obtain a suitable degree of control over the redistribution of the pump beam energy, it is preferable that the directionality of the diode modules 112 in the Y direction be relatively high. Unlike a flash lamp which emits photons in all directions, the diode modules 112 emit the pump beam roughly perpendicularly to their emitting surface. The directionality of a light source describes the quantity of photons which are emitted as a function of direction, and may be quantified as two times the angle from the emitting surface normal to the direction at which the light power is half of its value in the emitting surface normal direction (referred to as "half power-full angle").

Typically, if the directionality of the diode modules 112 in the Y direction is less than about 15 degrees (half power-full angle), a suitable degree of control over the pump distribution is achieved. The relationship between the directionality of the diode modules and control of the pump distribution can be understood from FIG. 10a, which shows a ray 200 which propagates from the diode array (not shown) at a relatively small angle (measured from the perpendicular to the face of the diode array). Because the angle is small, the ray 200 is redirected to the outer region 206, rather than to a more central region of the amplification medium 120. By contrast, if a ray 201 were propagated from the diode array at a more divergent angle, the ray 201 would be reflected to a central portion of the amplification medium 120, as shown, and it would be more difficult to achieve the redistribution profile 204 shown in FIG. 10b. Thus, the diode modules 112 are typically arranged such that the smaller emitting angle (e.g., 15 degrees) is oriented in the direction of the height (Y direction), as shown in FIGS. 1 and 5, while the larger emitting angle (e.g., 45 degrees) is oriented in the direction of the length (Z direction).

In addition to having a pump beam with relatively high directionality in the height dimension, it is desirable to have a pump distribution in the direction of the height which is homogeneous (flat) at the end of the tunnel 140. The homogeneous pump distribution in the height direction is important for correcting distortions, because the emission of the diode modules 112 is typically inhomogeneous, and the generation of the desired inhomogeneous pump distribution 204 requires a reproducible intensity distribution to start with. Thus, it is desirable to have a tunnel 140 which homogenizes the pump distribution so that it is initially flat.

Control over the pump distribution may also be enhanced by situating the ends of the redirecting members 150 as close to the amplification medium 120 as possible. For example, in the embodiment shown in FIG. 5, the respective ends of the redirecting members 150 are removed from the amplification medium 120 only by the width of the cooling channel 123. By extending the redirecting members 150 from the tunnel 140 to close to the amplification medium 120, the pump distribution does not have sufficient distance (between the ends of the redirecting members 150 and the amplification medium 120) to undergo a spatial change before arriving at the amplification medium, as it would if the amplification medium were more remote from the ends of redirecting members 150.

The pump distribution in the direction of the length (Z direction) is typically less important with regard to optical distortions, and is efficiently smoothed out by the large emission angle (e.g., 45 degrees) of the diode modules 112 in the Z direction. Because of the large emission angle in the Z direction, the tunnel 140 mainly confines the radiation of the pump beam. Homogenization in the Z direction is less important for the purpose of correcting distortions, and is typically achieved at a short distance from the diode modules 112.

Exemplary embodiments of the invention provide the significant advantage that the pump distribution can be adjusted "on-line", while the laser apparatus 100 is running, to reduce actual, observed optical distortions in the laser beam. Computer modeling may provide a general idea as to which theoretical pump distribution will correct optical distortions. However, computer models generally do not accurately predict the detailed behavior of the laser beam, because some optical effects are not well understood, or are prohibitively complex to model. These disadvantages are circumvented with exemplary embodiments of the invention in which the optics which launch the pump beam from the tunnel 140 are adjustable while the laser is running. Hence, rather than deriving a theoretical pump distribution from an inaccurate model, the actual measured or observed distortions are minimized on-line.

For example, the optimal location and amplitude of the regions 206 of increased intensity of the pump beam depend on, among other things, the details of the edge preparation of the amplification medium 120 and the cooling of the amplification medium 120. Because these factors can vary significantly from one apparatus to another, in order to be able to cope with every situation, the redirecting members 150 are preferably adjustable on line while the diode arrays 110 are running. With proper on-line adjustment, the regions 206 of increased intensity in the pump distribution create a positive focal power which compensates at least partially for the heat-induced negative focal power to improve the beam quality and to increase the extractable fraction of the amplification medium volume.

While the invention has been described with reference to preferred embodiments, those skilled in the art will understand that various changes may be made, and equivalents may be substituted for elements thereof, without departing from the scope of the invention. In addition, many modifications may be made to adapt a particular situation or material to the teachings of the invention without departing from the scope thereof. Therefore, it is intended that the invention not be limited to the particular embodiments disclosed as the best mode contemplated for carrying out the invention, but that the invention will include all embodiments falling within the scope of the appended claims.

What is claimed is:

1. A laser comprising:
   an amplification medium which amplifies a coherent beam passing through the amplification medium;
   a pump which provides energy to the amplification medium such that the energy is incident on a surface of the amplifying medium across a beam area; and
   at least one moveable member for adjusting a spatial distribution of energy over the beam area on the surface of the amplification medium.

2. The laser of claim 1, wherein the moveable member has a reflecting surface which reflects a portion of the energy provided by the pump.

3. The laser of claim 2, further comprising an adjustment device for adjusting an angle between the reflecting surface of the moveable member and a central axis normal to the emitting surface of the pump.

4. The laser of claim 1, further comprising an adjustment device for adjusting a distance between the moveable member and a central axis along a propagation direction of the energy provided by the pump.

5. The laser of claim 1, further comprising a tunnel member which forms a tunnel between the pump and the moveable member, wherein the tunnel member is adapted to vary a cross sectional area of the tunnel.

6. The laser of claim 1, wherein the amplification medium comprises a slab of yttrium-aluminum-garnet doped with neodymium.

7. The laser of claim 1, wherein the pump comprises an array of diodes.

8. The laser of claim 7, wherein the array of diodes emits radiation having a directionality of 15 degrees or less with respect to a perpendicular to a face of the array of diodes in the direction of the moveable member.

9. The laser of claim 1, wherein the moveable member is adapted to increase an intensity of the energy provided to a peripheral region of the amplification medium.

10. The laser of claim 1, further comprising a micrometer for adjusting a position of the moveable member.

11. The laser of claim 1, wherein the amplification medium includes oblique end faces which cause the coherent beam to propagate through both inner and outer regions of the amplification medium.

12. The laser of claim 11, wherein the coherent beam propagates in a zig-zag pattern through the amplification medium.

13. A laser comprising:
   an amplification medium which amplifies a coherent beam passing through the amplification medium;
   a pump which provides energy to the amplification medium;
   a tunnel having a first end proximate to the pump and a second end proximate to the amplification medium, wherein the energy provided by the pump passes through the tunnel en route to the amplification medium; and
   redirection means, disposed at the second end of the tunnel, for redirecting a portion of the energy provided by the pump.

14. The laser of claim 13, further comprising means for adjusting a position of the redirection means with respect to the tunnel.

15. The laser of claim 13, wherein the redirection means comprises a reflecting member having a reflecting surface which redirects the portion of the energy provided by the pump.

16. The laser of claim 15, further comprising an adjustment device for adjusting an angle between the reflecting surface and a propagation direction of the energy provided by the pump.

17. The laser of claim 13, further comprising an adjustment device for adjusting a distance between the redirection means and a central axis along a propagation direction of the energy provided by the pump.

18. The laser of claim 13, wherein the first end of the tunnel has a first cross sectional area and the second end of the tunnel has a second cross sectional area which is less than the first cross sectional area.

19. The laser of claim 18, further comprising means for adjusting a cross sectional area of the second end of the tunnel.

20. The laser of claim 13, wherein the pump comprises an array of diodes which have a directionality of less than about 15 degrees with respect to a perpendicular to a face of the array of diodes in a direction of the redirection means.

21. The laser of claim 13 wherein the amplification medium comprises a slab of yttrium-aluminum-garnet doped with neodymium.

22. A laser comprising:

an amplification medium which amplifies a coherent beam passing through the amplification medium;

a diode array which generates a pump beam, the pump beam having a spatial distribution of intensity, wherein the intensity is substantially constant over the spatial distribution at a location remote from the diode array; and redirection means for redirecting a portion of the pump beam at the location remote from the diode array such that the intensity of the pump beam incident on the amplification medium is not substantially constant.

23. The laser of claim 22, wherein the pump beam has a directionality of no greater than 15 degrees with respect to a perpendicular to a face of the diode array in a direction of the redirection means.

24. The laser of claim 22, wherein the redirection means comprises a moveable member which has a reflecting surface.

25. The laser of claim, 22 further comprising a micrometer for adjusting a position of the redirection means.

26. The laser of claim 24, further comprising adjustment means for adjusting an angle between the reflecting surface of the moveable member and a propagation direction of the pump beam.

27. The laser of claim 24, further comprising adjustment means for adjusting a distance between the moveable member and a central axis along a propagation direction of the pump beam.

28. The laser of claim 22, wherein the redirection means is adapted to redirect said portion of the pump beam to a peripheral region of the amplification medium.

29. The laser of claim 22, wherein the amplification medium comprises a slab of yttrium-aluminum-garnet doped with neodymium.

30. A method for forming a laser beam comprising the steps of:

pumping energy into an amplification medium, wherein the energy has a spatial intensity distribution;

directing a laser beam into the amplification medium such that the laser beam is amplified; and adjusting the spatial intensity distribution of the energy pumped into the amplification medium while the laser beam is being amplified.

31. The method of claim 30, wherein the step of adjusting the spatial intensity distribution comprises adjusting a position of a redirecting member which redirects a portion of the pump energy.

32. The method of claim 31, wherein the step of pumping energy comprises emitting the energy from a diode array such that a directionality of the energy emitted from the diode array is less than or equal to about 15 degrees with respect to a perpendicular to a face of the diode array in a direction of the redirecting member.

33. The method of claim 30, wherein the step of adjusting the spatial intensity distribution comprises redirecting the energy to a peripheral region of the amplification medium.

* * * * *